(12) United States Patent          (10) Patent No.:     US 8,690,369 B2
     Chen                          (45) Date of Patent:     Apr. 8, 2014

(54) LUMINOUS KEYING MODULE OF HANDHELD DEVICE

(75) Inventor: Chung-Yuan Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 63 days.

(21) Appl. No.: 13/586,484

(22) Filed: Aug. 15, 2012

(65) Prior Publication Data

US 2013/0286631 A1    Oct. 31, 2013

(30) Foreign Application Priority Data

Apr. 27, 2012  (TW) ............................... 101115188 A (51) Int. Cl.
    *G01D 11/28*       (2006.01)
(52) U.S. Cl.
    USPC .................. 362/23.03; 362/23.05; 362/23.04

(58) Field of Classification Search
    USPC .................................. 362/23.03, 23.05, 23.04
    See application file for complete search history.

(56) References Cited

U.S. PATENT DOCUMENTS

| 2007/0285947 A1* | 12/2007 | Kim .............................. 362/631 |
| 2011/0284354 A1* | 11/2011 | Kato et al. .................... 200/406 |
| 2012/0182760 A1* | 7/2012  | Ohrui et al. .................. 362/602 |

\* cited by examiner

*Primary Examiner* — Evan Dzierzynski
(74) *Attorney, Agent, or Firm* — Kirton McConkie; Evan R. Witt (57) ABSTRACT

A luminous keying module of a handheld device includes a light-emitting element, a light-guiding membrane wiring board, a keying layer, and an elastic layer. A circuit pattern including plural membrane switches is formed on the light-guiding membrane wiring board. When the keying layer is pressed down, the keycap is moved downwardly to push the elastic layer. Consequently, a corresponding conductive structure of the elastic layer is moved downwardly to trigger a corresponding membrane switch.

22 Claims, 6 Drawing Sheets

LUMINOUS KEYING MODULE OF HANDHELD DEVICE

FIELD OF THE INVENTION

The present invention relates to a luminous keying module, and more particularly to a luminous keying module of a handheld device.

BACKGROUND OF THE INVENTION

Recently, with increasing development of information industries, handheld devices such as notebook computers, personal digital assistants or remote controllers are widely used in many instances. In a case that a handheld device is used in a dim environment, the numbers and characters marked on the keys of the keyboard of the handheld device can not be clearly visible. In other words, the dim environment becomes hindrance from operating the keyboard. In addition, if the keyboard is used in the dim environment, the user is readily suffered from vision impairment. For solving these drawbacks, a luminous keying module has been disclosed. The luminous keying module may be used in the dim environment in order to enhance the applications thereof. Moreover, by changing the arrangement of the luminous regions, the handheld device having the luminous keying module is more aesthetically-pleasing and thus the competitiveness thereof is enhanced.

Figure 1:
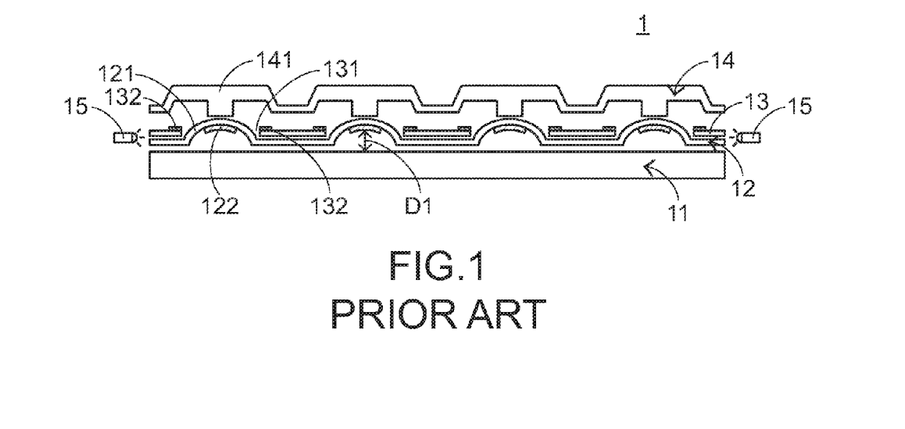
FIG. 1 is a schematic cross-sectional view illustrating a conventional luminous keying module of a handheld device.
Figure 2:
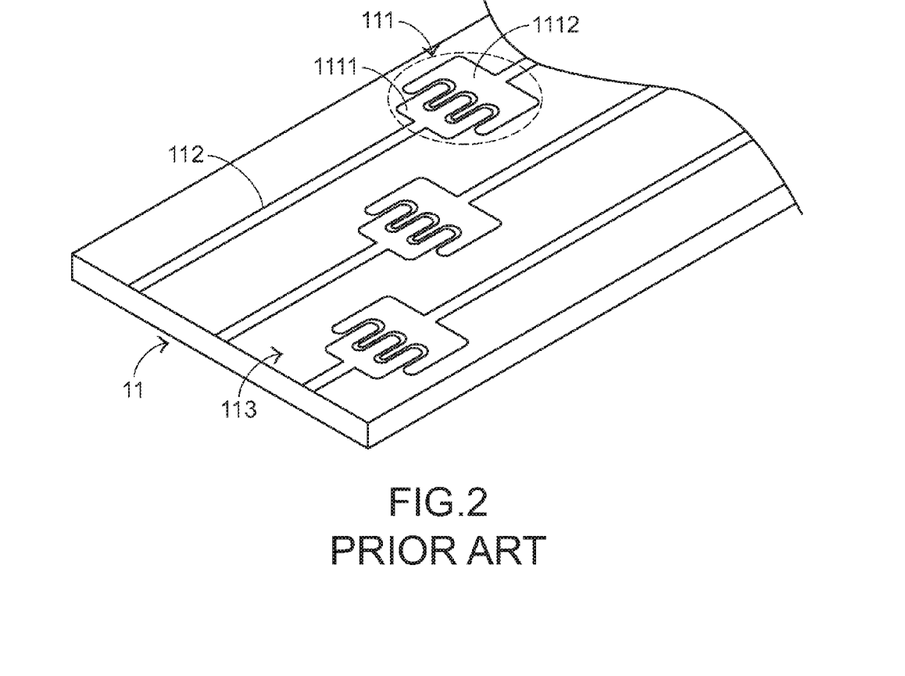
FIG. 2 is a schematic partial perspective view illustrating a circuit board used in the luminous keying module of FIG. 1.

FIG. 1 is a schematic cross-sectional view illustrating a conventional luminous keying module of a handheld device. FIG. 2 is a schematic partial perspective view illustrating a circuit board used in the luminous keying module of FIG. 1. Please refer to FIGS. 1 and 2. From bottom to top, a circuit board 11, an elastic layer 12, a light guide plate 13 and a keying layer 14 of the luminous keying module 1 are sequentially shown. In addition, plural light-emitting elements 15 are arranged beside the light guide plate 13. A circuit pattern 113 including plural membrane switches 111 and plural silver paste conductor lines 112 is formed on the circuit board 11. Each of the membrane switches 111 comprises a first conductive part 1111 and a second conductive part 1112. The first conductive part 1111 and the second conductive part 1112 are separated from each other.

Moreover, the elastic layer 12 has plural elastic bulges 121 corresponding to the plural membrane switches 111. A conductive structure 122 is printed on a bottom surface of each elastic bulge 121. The keying layer 14 has plural keycaps 141 corresponding to respective elastic bulges 121. Each conductive structure 122 and the corresponding membrane switch 111 are separated from each other by a spacing interval D1. The light guide plate 13 has plural perforations 131 corresponding to respective elastic bulges 121. The plural elastic bulges 121 are penetrated through respective perforations 131. When any keycap 141 is pressed down by a user, the corresponding elastic bulge 121 is pushed and compressed by the keycap 141. As the elastic bulge 121 is moved downwardly, the corresponding conductive structure 122 is contacted with the corresponding membrane switch 111. Under this circumstance, the first conductive part 1111 and the second conductive part 1112 are electrically connected with each other, so that the circuit board 11 generates a corresponding key signal. Whereas, when the depressing force exerted on the keycap 141 is eliminated, an elastic force provided by the compressed elastic bulge 121 is acted on the keycap 141. Due to the elastic force, the elastic bulge 121 is returned to the original shape. Correspondingly, the keycap 141 is moved upwardly and returned to its original position.

Moreover, the light guide plate 13 has plural light-guiding dots 132 for collecting and scattering light beams. The locations of the plural light-guiding dots 132 are determined according to the locations of the plural keycaps 141. After the light beams are incident into the light guide plate 13, the light beams by the light-emitting element 15 are diffused within the light guide plate 13. Due to the ink properties of the plural light-guiding dots 132, the light beams that are projected to the light-guiding dots 132 will be scattered upwardly or downwardly. The portion of the light beams that are scattered upwardly will be directed to the keycaps 141. In such way, the luminous keying module 1 has the luminous function.

However, the conventional luminous keying module 1 still has the following drawbacks.

Firstly, since a portion of the light beams projected to the light-guiding dots 132 are scattered downwardly, a part of the light amount is lost.

Figure 3:
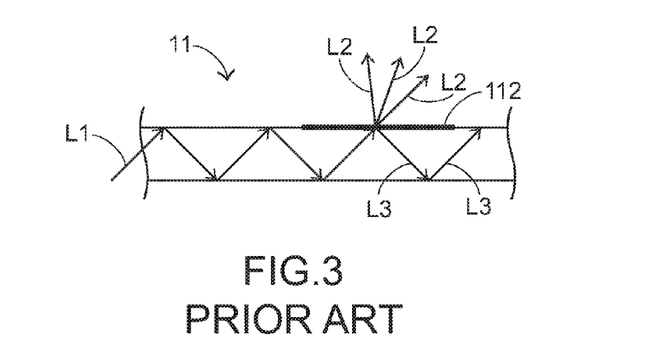
FIG. 3 schematically illustrates a light path in the light guide plate of the luminous keying module of FIG. 1.

Secondly, please also refer to FIG. 3. FIG. 3 schematically illustrates a light path in the light guide plate of the luminous keying module of FIG. 1. Since the circuit pattern 113 comprises plural silver paste conductor lines 112 and these silver paste conductor lines 112 have functions of collecting and scattering the light beams, after the light beams L1 provided by the light-emitting elements 15 are introduced into the light guide plate 13, the light beams L2 passing through the silver paste conductor lines 112 of the circuit pattern 113 seem very bright. Since most of the silver paste conductor lines 112 are not aligned with the plural keycaps 141, the amount of the light beams to be directed to the keycaps 141 to illuminate the keycaps 141 are consumed by the silver paste conductor lines 112. That is, although the light beams L1 should be mostly directed to the keycaps 141 according to the original design, the silver paste conductor lines 112 may consume the amount of the light beams L2 because of the characteristics of the silver paste conductor lines 112. Consequently, only the light beams L3 are retained to be utilized by the light guide plate 13. Under this circumstance, the plural keycaps 141 of the luminous keying module 1 fail to be effectively illuminated.

Thirdly, since the light guide plate 13 has plural perforations 131, the light-guiding function of the light guide plate 13 is discontinuous. That is, when the light beams from the light-emitting elements 15 are incident into the light guide plate 13, the light beams are blocked by the perforations 131. Under this circumstance, the illuminating efficacy of the luminous keying module 1 is impaired. For increasing the luminance of the luminous keying module 1, it is necessary to increase the number of the light-emitting elements 15. The additional light-emitting elements 15 increase the fabricating cost of the luminous keying module 1.

Fourthly, since the luminous keying module 1 has too many components in a staked arrangement, it is difficult to reduce the overall thickness of the luminous keying module 1.

From the above discussions, the light utilization of the conventional luminous keying module of a handheld device is usually unsatisfied.

SUMMARY OF THE INVENTION

The present invention relates to a luminous keying module of a handheld device, and more particularly to a luminous keying module with enhanced light utilization, reduced thickness, cost-effectiveness and power-saving efficacy.

In accordance with an aspect of the present invention, there is provided a luminous keying module of a handheld device. The luminous keying module includes at least one light-emitting element, a light-guiding membrane wiring board, a keying layer, and an elastic layer. The at least one light-emitting element is used for providing light beams. The light-guiding membrane wiring board is used a light-guiding membrane wiring board for receiving and transferring the light beams from the at least one light-emitting element. A circuit pattern is formed on the light-guiding membrane wiring board, and the circuit pattern includes plural membrane switches. Each of the membrane switches includes a first conductive part and a second conductive part. In addition, the first conductive part and the second conductive part are separated from each other. The keying layer includes plural keycaps corresponding to respective membrane switches. The elastic layer is arranged between the light-guiding membrane wiring board and the keying layer. In addition, plural conductive structures are formed on a bottom surface of the elastic layer. Each conductive structure is aligned with a corresponding membrane switch. Each conductive structure and the corresponding membrane switch are separated from each other by a spacing interval. When any of the plural conductive structures is contacted with the corresponding membrane switch, the first conductive part and the second conductive part of the corresponding membrane switch are electrically connected with each other.

In an embodiment, the light-guiding membrane wiring board includes a first film layer, a second film layer, and plural light-guiding dots, wherein the first film layer and the second film layer are stacked on each other for increasing an amount of the light beams which are scattered upwardly by the plural light-guiding dots.

In an embodiment, each of the first film layer and the second film layer is a light-guiding film layer.

In an embodiment, the plural light-guiding dots are arranged between the first film layer and the second film layer.

In an embodiment, the plural light-guiding dots are formed on one of the first film layer and the second film layer by a screen printing process, a thermal compression process or an injection process.

In an embodiment, the light-guiding membrane wiring board further includes a spacer film layer. The spacer film layer is arranged between the first film layer and the circuit pattern for increasing possibility of generating total internal reflection within the first film layer when the light beams are incident into the first film layer.

In an embodiment, the spacer film layer is formed on the first film layer by a printing process, a film deposition process, a gluing process or a thermal compression process.

In an embodiment, the luminous keying module further includes a light-transmissible transparent adhesive. The light-transmissible transparent adhesive is arranged between the first film layer and the second film layer, so that the first film layer and the second film layer are combined together through the light-transmissible transparent adhesive.

In an embodiment, the light-guiding film layer is made of polyethylene terephthalate (PET), polycarbonate (PC) or polymethylmethacrylate (PMMA).

In an embodiment, the first film layer is a light-guiding film layer, and the second film layer is a spacer film layer. The spacer film layer is arranged between the light-guiding film layer and the plural membrane switches for increasing possibility of generating total internal reflection within the light-guiding film layer when the light beams are incident into the light-guiding film layer.

In an embodiment, the plural light-guiding dots are formed on a bottom surface of the light-guiding film layer.

In an embodiment, the spacer film layer is formed on the light-guiding film layer by a printing process, a film deposition process, a gluing process or a thermal compression process.

In an embodiment, the light-guiding membrane wiring board includes a first film layer and a second film layer. The second film layer is arranged between the first film layer and the plural membrane switches, wherein a refractive index of the second film layer is lower than a refractive index of the first film layer.

In an embodiment, the second film layer is a single continuous film layer or the second film layer includes plural separate block-type film layers. The second film layer is formed on the first film layer by a printing process, a film deposition process, a gluing process or a thermal compression process.

In an embodiment, the first film layer is a light-guiding film layer.

In an embodiment, the light-guiding film layer is made of polyethylene terephthalate (PET), polycarbonate (PC) or polymethylmethacrylate (PMMA).

In an embodiment, the light-emitting element is a light emitting diode. The light emitting diode is located beside the light-guiding membrane wiring board for emitting the light beams to the light-guiding membrane wiring board.

In an embodiment, the luminous keying module further includes a base. The base is disposed under the light-guiding membrane wiring board for supporting the keying layer, the elastic layer, the light-guiding membrane wiring board and the light-emitting element.

In an embodiment, the elastic layer is made of polyethylene terephthalate (PET).

In an embodiment, the plural conductive structures are formed on the bottom surface of the elastic layer by a printing process.

In an embodiment, each of the plural conductive structures is made of a metallic material or a carbonic material.

In an embodiment, the handheld device is a handheld communication device or a handheld remote controller.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
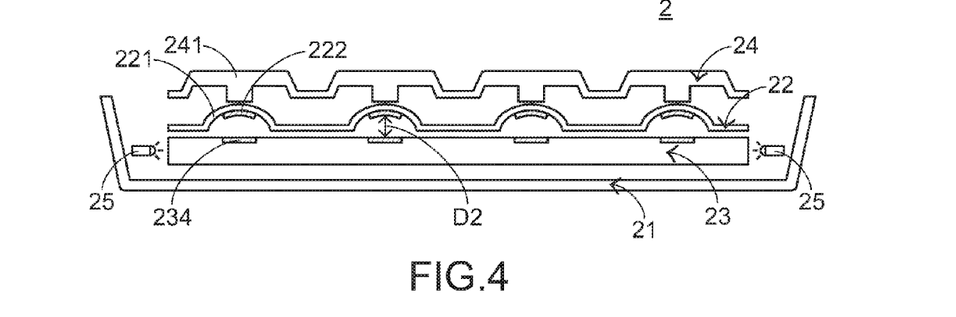
FIG. 4 is a schematic side view illustrating a luminous keying module of a conventional handheld device according to a first embodiment of the present invention.

FIG. 4 is a schematic side view illustrating a luminous keying module of a conventional handheld device according to a first embodiment of the present invention. From bottom to top, a base 21, a light-guiding membrane wiring board 23, an elastic layer 22, and a keying layer 24 of the luminous keying module 2 are sequentially shown. In addition, plural light-emitting elements 25 are arranged beside the light-guiding membrane wiring board 23. In this embodiment, the handheld device is a handheld communication device or a handheld remote controller. An example of the light-emitting element 25 includes but is not limited to a light emitting diode. Moreover, the base 21 is used for supporting the light-guiding membrane wiring board 23, the elastic layer 22, and the keying layer 24.

Figure 5:
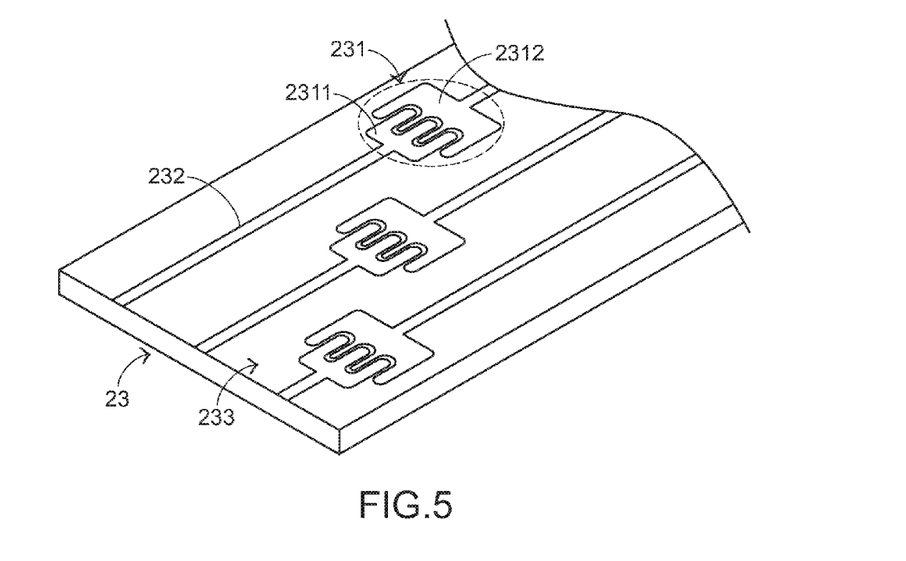
FIG. 5 is a schematic partial perspective view illustrating a light-guiding membrane wiring board used in the luminous keying module of FIG. 4.

FIG. 5 is a schematic partial perspective view illustrating a light-guiding membrane wiring board used in the luminous keying module of FIG. 4. Please refer to FIGS. 4 and 5. The light-guiding membrane wiring board 23 is a single-layered light-guiding film layer. The light-guiding membrane wiring board 23 is made of polycarbonate (PC) or polyethylene terephthalate (PET). A circuit pattern 233 including plural membrane switches 231 and plural silver paste conductor lines 232 is formed on the light-guiding membrane wiring board 23. Each of the membrane switches 231 comprises a first conductive part 2311 and a second conductive part 2312. The first conductive part 2311 and the second conductive part 2312 are separated from each other.

Moreover, the elastic layer 22 has plural elastic bulges 221 corresponding to the plural membrane switches 231. A conductive structure 222 is printed on a bottom surface of each elastic bulge 221. Each conductive structure 222 and the corresponding membrane switch 231 are separated from each other by a spacing interval D2. The keying layer 24 has plural keycaps 241 corresponding to respective elastic bulges 221. In this embodiment, each conductive structure 222 is made of a carbonic material or a metallic material. In addition, the elastic layer 22 is made of a transparent material such as polycarbonate (PC) or polyethylene terephthalate (PET).

When any keycap 241 is pressed down by a user, the corresponding elastic bulge 221 is pushed and compressed by the keycap 241. As the elastic bulge 221 is moved downwardly, the corresponding conductive structure 222 is contacted with the corresponding membrane switch 231. Under this circumstance, the first conductive part 2311 and the second conductive part 2312 are electrically connected with each other, so that the light-guiding membrane wiring board 23 generates a corresponding key signal. Whereas, when the depressing force exerted on the keycap 241 is eliminated, an elastic force provided by the compressed elastic bulge 221 is acted on the keycap 241. Due to the elastic force, the elastic bulge 221 is returned to the original shape. Correspondingly, the keycap 241 is moved upwardly and returned to its original position.

Moreover, plural light-guiding dots 234 are printed on the light-guiding membrane wiring board 23 for collecting and scattering light beams. The locations of the plural light-guiding dots 234 are determined according to the locations of the plural keycaps 241. After the light beams emitted by the light-emitting element 25 are incident into the light-guiding membrane wiring board 23, the light beams are diffused within the light-guiding membrane wiring board 23. Due to the ink properties of the plural light-guiding dots 234, the light beams that are projected to the light-guiding dots 234 will be scattered upwardly or downwardly. The portion of the light beams that are scattered upwardly will be transmitted through the elastic layer 22 and directed to the keycaps 241. In such way, the luminous keying module 2 has the luminous function.

Figure 6:
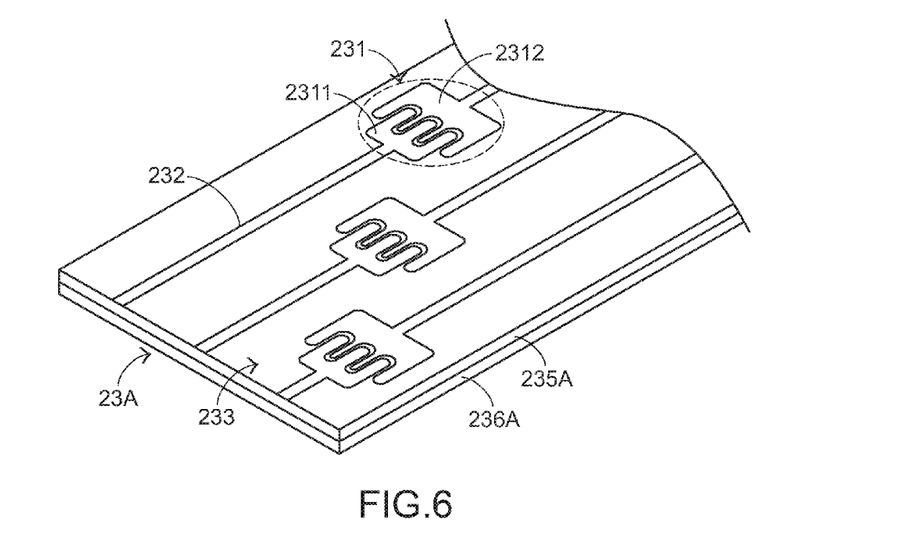
FIG. 6 is a schematic partial perspective view illustrating a light-guiding membrane wiring board of a luminous keying module according to a second embodiment of the present invention.
Figure 7:
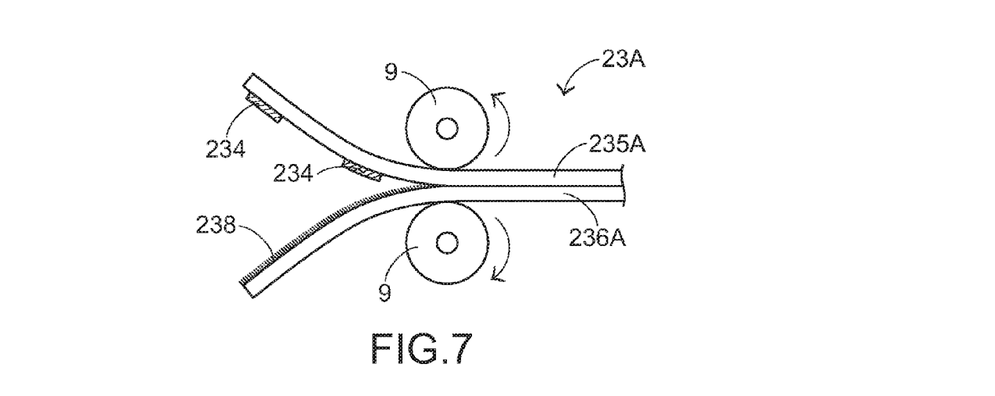
FIG. 7 is a schematic side view illustrating a process of forming the light-guiding membrane wiring board of FIG. 6.

Moreover, the luminous keying module of the handheld device of the present invention may have a multilayered film configuration. FIG. 6 is a schematic partial perspective view illustrating a light-guiding membrane wiring board of a luminous keying module according to a second embodiment of the present invention. FIG. 7 is a schematic side view illustrating a process of forming the light-guiding membrane wiring board of FIG. 6. Except that the light-guiding membrane wiring board 23A has the multilayered film configuration, the other components of the luminous keying module are substantially identical to those of the first embodiment, and are not redundantly described herein.

Please refer to FIGS. 6 and 7. In this embodiment, the light-guiding membrane wiring board 23A comprises a first film layer 235A and a second film layer 236A, wherein the first film layer 235A is attached on a top surface of the second film layer 236A. In addition, plural light-guiding dots 234 are arranged between the first film layer 235A and the second film layer 236A for collecting and scattering the light beams from the light-emitting elements 25. The locations of the plural light-guiding dots 234 are determined according to the locations of the plural keycaps 241. By the plural light-guiding dots 234, the light beams are projected upwardly toward the plural keycaps 241. Each of the first film layer 235A and the second film layer 236A is made of a light-guiding material. The light-guiding material includes for example polycarbonate (PC) or polyethylene terephthalate (PET). Moreover, the circuit pattern 233 is printed on the top surface of the first film layer 235A.

A process of fabricating the light-guiding membrane wiring board 23A will be illustrated as follows. Firstly, plural light-guiding dots 234 are formed on the bottom surface of the first film layer 235A, and a light-transmissible transparent adhesive 238 is coated on the top surface of the second film layer 236A. Alternatively, plural light-guiding dots 234 are formed on the top surface of the second film layer 236A, and a light-transmissible transparent adhesive 238 is coated on the bottom surface of the first film layer 235A. Then, the first film layer 235A and the second film layer 236A are hot-pressed or cold-pressed by two rollers 9, so that the first film layer 235A and the second film layer 236A are combined together through the light-transmissible transparent adhesive 238.

Figure 8:
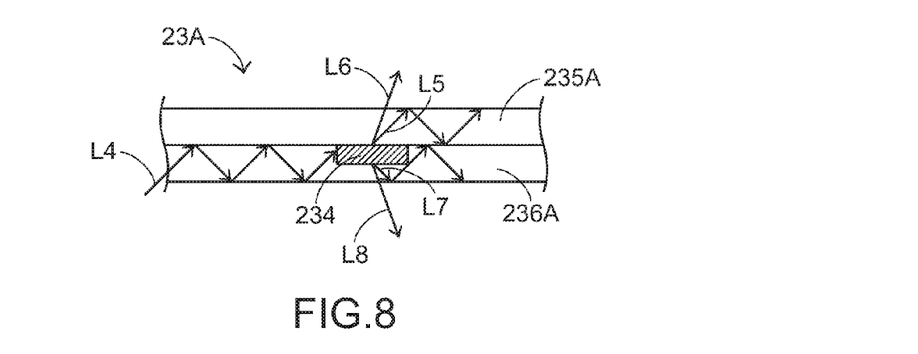
FIG. 8 schematically illustrates a light path in the light-guiding membrane wiring board of FIG. 7.

FIG. 8 schematically illustrates a light path in the light-guiding membrane wiring board of FIG. 7. Please refer to FIGS. 4 and 8. After the light beams L4 from the light-emitting element 25 are incident into the light-guiding membrane wiring board 23A, the light beams L4 can be diffused within the second film layer 236A and the first film layer 235A. When the light beams hit the light-guiding dots 234, the light beams will be partially collected by the light-guiding dots 234 and partially scattered upwardly or downwardly. A portion of the light beams that are scattered upwardly (i.e. L5) will be transferred within the first film layer 235A. Another portion of the light beams that are scattered upwardly (i.e. L6) will be sequentially transmitted through the first film layer 235A and the elastic layer 22 and directed upwardly to the keycaps 241, thereby illuminating the plural keycaps 241. A portion of the light beams that are scattered downwardly (i.e. L7) will be transferred within the second film layer 236A. Another portion of the light beams that are scattered downwardly (i.e. L8) will be transmitted through the second film layer 236A and lost.

The benefits of the light-guiding membrane wiring board 23A of the second embodiment will be illustrated as follows. Since the plural light-guiding dots 234 are arranged between the first film layer 235A and the second film layer 236A, the portion of the light beams that are scattered downwardly (i.e. L7) by the light-guiding dots 234 and continuously transferred within the second film layer 236A will be recycled by the second film layer 236A. That is, only the portion of the light beams that are scattered downwardly (i.e. L8) and transmitted through the second film layer 236A are lost. Whereas, if the light-guiding membrane wiring board 23A is a single-layered light-guiding film layer similar to the light-guiding membrane wiring board 23 of the first embodiment (i.e. only the first film layer 235A and the plural light-guiding dots 234 are included in the light-guiding membrane wiring board 23A but the second film layer 236A is excluded), the portion of the light beams that are scattered downwardly will be completely lost.

Figure 9:
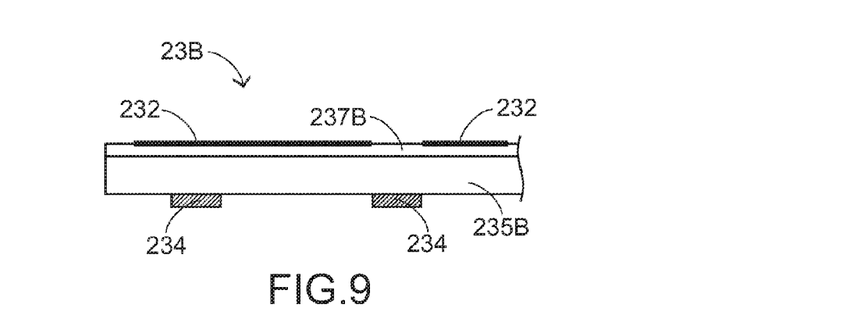
FIG. 9 is a schematic partial side view illustrating a light-guiding membrane wiring board of a luminous keying module according to a third embodiment of the present invention.
Figure 10:
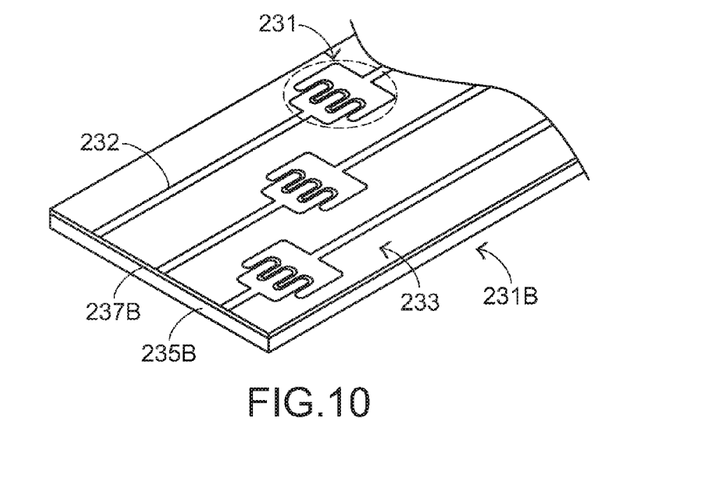
FIG. 10 is a schematic partial perspective view illustrating the light-guiding membrane wiring board of FIG. 9.

FIG. 9 is a schematic partial side view illustrating a light-guiding membrane wiring board of a luminous keying module according to a third embodiment of the present invention. FIG. 10 is a schematic partial perspective view illustrating the light-guiding membrane wiring board of FIG. 9. Except that the light-guiding membrane wiring board 23B has the multi-layered film configuration, the other components of the luminous keying module are substantially identical to those of the first embodiment, and are not redundantly described herein.

Please refer to FIGS. 9 and 10. In this embodiment, the light-guiding membrane wiring board 23B comprises a first film layer 235B and a spacer film layer 237B. The spacer film layer 237B is formed on a top surface of the first film layer 235B. In addition, plural light-guiding dots 234 are formed on a bottom surface of the first film layer 235B. The locations of the plural light-guiding dots 234 are determined according to the locations of the plural keycaps 241. By the plural light-guiding dots 234, the light beams are projected upwardly toward the plural keycaps 241. The circuit pattern 233 is printed on the top surface of the spacer film layer 237B. In addition, the circuit pattern 233 comprises plural membrane switches 231 and plural silver paste conductor lines 232. The plural silver paste conductor lines 232 have functions of collecting and scattering the light beams. In this embodiment, the spacer film layer 237B is a single continuous film layer, and the plural silver paste conductor lines 232 are formed on the single continuous film layer.

Moreover, during the process of forming the light-guiding membrane wiring board 23B, the spacer film layer 237B is formed on the top surface of the first film layer 235B by a printing process, a film deposition process, a gluing process or a thermal compression process. In this embodiment, the first film layer 235B is made of a light-guiding material. An example of the light-guiding material includes but is not limited to polycarbonate (PC), polyethylene terephthalate (PET) or polymethylmethacrylate (PMMA). Whereas, the spacer film layer 237B is made of a material different from the first film layer 235B.

Figure 11:
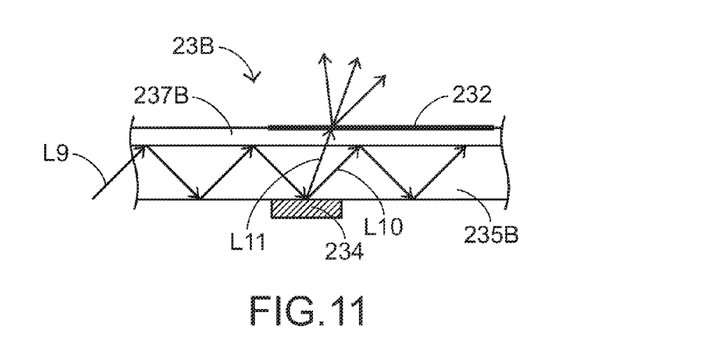
FIG. 11 schematically illustrates a light path in the light-guiding membrane wiring board of FIG. 9.

FIG. 11 schematically illustrates a light path in the light-guiding membrane wiring board of FIG. 9. After the light beams L9 from the light-emitting element 25 are incident into the light-guiding membrane wiring board 23B, the light beams L9 can be diffused within the first film layer 235B. When the light beams L9 hit the light-guiding dots 234, the light beams will be partially collected by the light-guiding dots 234 and partially scattered upwardly or downwardly. A portion of the light beams that are scattered upwardly (i.e. L10) will be transferred within the first film layer 235B. Another portion of the light beams that are scattered upwardly (i.e. L11) will be transmitted through the first film layer 235B.

In this embodiment, the spacer film layer 237B is arranged between the circuit pattern 233 and the first film layer 235B. In addition, the spacer film layer 237B is made of a material different from the first film layer 235B. That is, the refractive index of the spacer film layer 237B is lower than the refractive index of the first film layer 235B. Consequently, the light beams transferred through the first film layer 235B (e.g. along the light paths of the light beams L9 and the light beams L10) are readily subject to total internal reflection. Under this circumstance, after the light beams are transmitted through the first film layer 235B (i.e. along the light path of the light beams L11), the percentage of the light beams to be collected and scattered by the silver paste conductor lines 232 of the circuit pattern 233 will be largely reduced. Consequently, the amount of light beams to be scattered upwardly by the light-guiding dots 234 of the light-guiding membrane wiring board 23B will be increased, and the keycaps 241 of the luminous keying module 2 are illuminated by more light beams.

Figure 12:
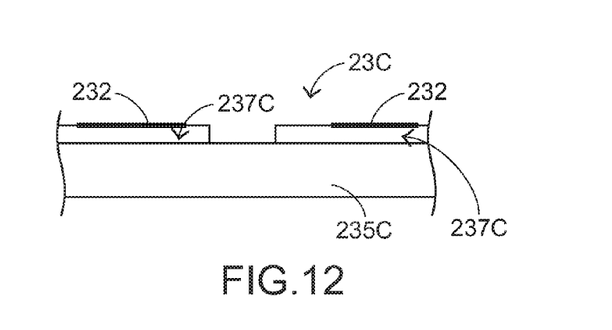
FIG. 12 is a schematic partial side view illustrating a light-guiding membrane wiring board of a luminous keying module according to a fourth embodiment of the present invention.
Figure 13:
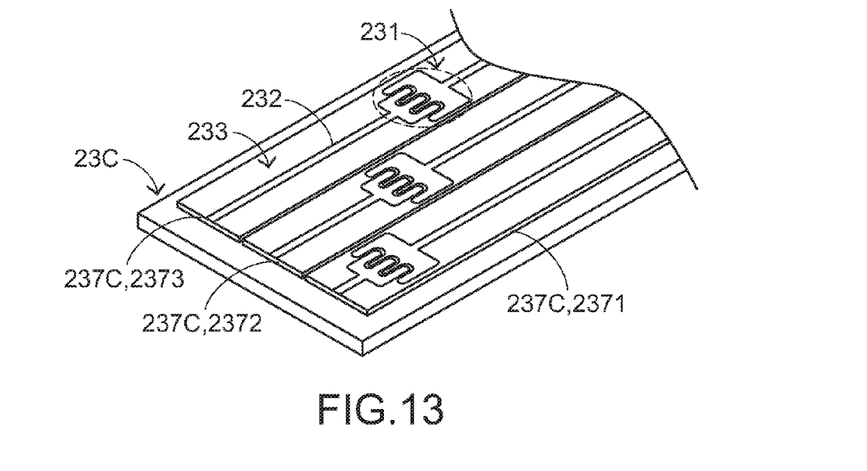
FIG. 13 is a schematic partial perspective view illustrating the light-guiding membrane wiring board of FIG. 12.

FIG. 12 is a schematic partial side view illustrating a light-guiding membrane wiring board of a luminous keying module according to a fourth embodiment of the present invention. FIG. 13 is a schematic partial perspective view illustrating the light-guiding membrane wiring board of FIG. 12. In comparison with the luminous keying module of the third embodiment, the spacer film layer 237C of the light-guiding membrane wiring board 23C of this embodiment is distinguished and no light-guiding dots are formed on the light-guiding membrane wiring board 23C.

Please refer to FIGS. 12 and 13. In this embodiment, the spacer film layer 237C of the light-guiding membrane wiring board 23C comprises plural separate block-type film layers 2371, 2372 and 2373. The plural silver paste conductor lines 232 are formed on the block-type film layers 2371, 2372 and 2373, respectively. Similarly, the refractive index of each of the block-type film layers 2371, 2372 and 2373 is lower than the refractive index of the first film layer 235C. However, those skilled in the art will readily observe that numerous modifications and alterations may be made while retaining the teachings of the invention. For example, some of the silver paste conductor lines 232 are formed on and spanned across any two of these block-type film layers 2371, 2372 and 2373.

Figure 14:
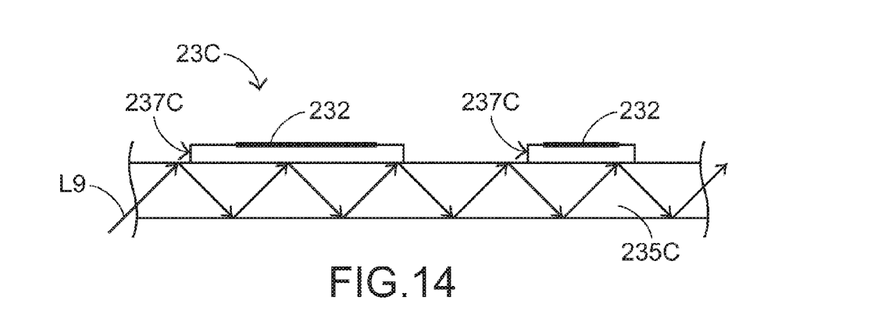
FIG. 14 schematically illustrates a light path in the light-guiding membrane wiring board of FIG. 12.

FIG. 14 schematically illustrates a light path in the light-guiding membrane wiring board of FIG. 12. As known, since the refractive index of air is 1, nearly none of the current optical materials has refractive index higher than air according to the state-of-the-art technology. Consequently, when the light beams L9 are laterally incident into the light-guiding membrane wiring board 23C, the regions of the first film layer 235C uncovered by the spacer film layer 237C are the optimal places that are subject to the total internal reflection. In other words, the efficacy of the total internal reflection of the light beams L9 in the first film layer 235C of this embodiment is better than that of the third embodiment. Consequently, the light beams provided to the light-guiding membrane wiring board 23C can be diffused to the whole first film layer 235C more uniformly.

Figure 15:
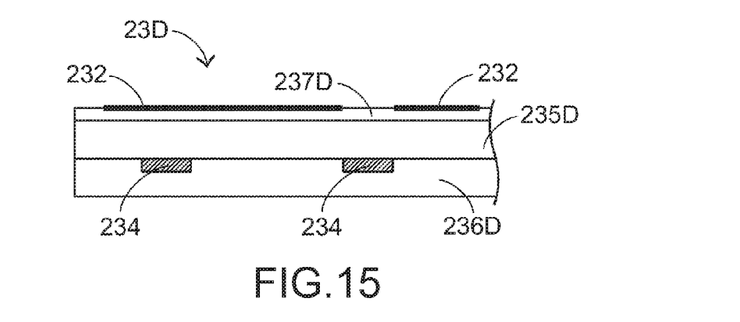
FIG. 15 is a schematic partial side view illustrating a light-guiding membrane wiring board of a luminous keying module according to a fifth embodiment of the present invention.

FIG. 15 is a schematic partial side view illustrating a light-guiding membrane wiring board of a luminous keying module according to a fifth embodiment of the present invention. Except for the structures of the light-guiding membrane wiring board 23D, the other components of the luminous keying module of this embodiment are substantially identical to those of the luminous keying modules of the second embodiment and the third embodiment, and are not redundantly described herein. In this embodiment, the light-guiding membrane wiring board 23D is a combination of the light-guiding membrane wiring board of the second embodiment and the light-guiding membrane wiring board of the third embodiment.

Please refer to FIGS. 4 and 15. In this embodiment, the light-guiding membrane wiring board 23D comprises a first film layer 235D, a second film layer 236D, and a spacer film layer 237D. The first film layer 235D is adhered on a top surface of the second film layer 236D The spacer film layer 237D is formed on a top surface of the first film layer 235D. In addition, plural light-guiding dots 234 are arranged between the first film layer 235D and the second film layer 236D for collecting and scattering the light beams from the light-emitting element 25. The locations of the plural light-guiding dots 234 are determined according to the locations of the plural keycaps 241. By the plural light-guiding dots 234, the light beams are projected upwardly toward the plural keycaps 241. Moreover, the circuit pattern 233 is printed on the top surface of the spacer film layer 237D.

In other words, the light-guiding membrane wiring board 23D of the fifth embodiment has the combined benefits of the second embodiment and the third embodiment. Moreover, the material and fabricating process of the light-guiding membrane wiring board 23D of the fifth embodiment are similar to those of the light-guiding membrane wiring board of the second embodiment and the third embodiment, and are not redundantly described herein. It is noted that the plural light-guiding dots 234 are not essential components to limit the scopes of the above embodiments. However, those skilled in the art will readily observe that numerous modifications and alterations may be made while retaining the teachings of the fifth embodiment. For example, the light-guiding membrane wiring board may be designed to have the combined structure of the second embodiment and the fourth embodiment.

From the above description, the circuit pattern of the luminous keying module of the present invention is directly printed on the light-guiding membrane wiring board. Since the circuit board used in the conventional luminous keying module is omitted, the overall thickness and the fabricating cost of the luminous keying module 2 of the present invention are reduced. Moreover, since the light-guiding membrane wiring board 23 of the luminous keying module 2 has the multilayered film configuration, the percentage of the light beams to be collected by the silver paste conductor lines 232 of the circuit pattern 233 will be largely reduced. Consequently, the amount of light beams to illuminate the keycaps 241 will be increased, and the light beams that are scattered downwardly by the light-guiding dots 234 will be further recycled. Under this circumstance, the keycaps 241 of the luminous keying module are illuminated by more light beams. In other words, the light beams provided by the light-emitting element 25 are efficiently utilized to illuminate the keycaps 241.

Moreover, since it is not necessary to install the perforations in the light-guiding membrane wiring board 23 of the luminous keying module 2, the light-guiding function of the light-guiding membrane wiring board 23 can be continuously performed. That is, the light beams provided by the light-emitting element 25 are no longer interrupted at the regions corresponding to the perforations. Under this circumstance, the illuminating efficacy of the luminous keying module 2 of the present invention will be largely enhanced. Moreover, since the illuminating efficacy of the luminous keying module 2 is largely enhanced, the number of the light-emitting element 25 may be reduced in order to meet the power-saving requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A luminous keying module of a handheld device, said luminous keying module comprising:
    at least one light-emitting element for providing light beams;
    a light-guiding membrane wiring board for receiving and transferring said light beams from said at least one light-emitting element, wherein a circuit pattern is formed on said light-guiding membrane wiring board, and said circuit pattern comprises plural membrane switches, wherein each of said membrane switches comprises a first conductive part and a second conductive part, and said first conductive part and said second conductive part are separated from each other;
    a keying layer comprising plural keycaps corresponding to respective membrane switches; and
    an elastic layer arranged between said light-guiding membrane wiring board and said keying layer, wherein plural conductive structures are formed on a bottom surface of said elastic layer, wherein each conductive structure is aligned with a corresponding membrane switch, and each conductive structure and said corresponding membrane switch are separated from each other by a spacing interval, wherein when any of said plural conductive structures is contacted with said corresponding membrane switch, said first conductive part and said second conductive part of said corresponding membrane switch are electrically connected with each other.

2. The luminous keying module according to claim 1, wherein said light-guiding membrane wiring board comprises a first film layer, a second film layer, and plural light-guiding dots, wherein said first film layer and said second film layer are stacked on each other for increasing an amount of said light beams which are scattered upwardly by said plural light-guiding dots.

3. The luminous keying module according to claim 2, wherein each of said first film layer and said second film layer is a light-guiding film layer.

4. The luminous keying module according to claim 3, wherein said plural light-guiding dots are arranged between said first film layer and said second film layer.

5. The luminous keying module according to claim 4, wherein said plural light-guiding dots are formed on one of said first film layer and said second film layer by a screen printing process, a thermal compression process or an injection process.

6. The luminous keying module according to claim 4, wherein said light-guiding membrane wiring board further comprises a spacer film layer, wherein said spacer film layer is arranged between said first film layer and said circuit pattern for increasing possibility of generating total internal reflection within said first film layer when said light beams are incident into said first film layer.

7. The luminous keying module according to claim 6, wherein said spacer film layer is formed on said first film layer by a printing process, a film deposition process, a gluing process or a thermal compression process.

8. The luminous keying module according to claim 3, further comprising a light-transmissible transparent adhesive, wherein said light-transmissible transparent adhesive is arranged between said first film layer and said second film layer, so that said first film layer and said second film layer are combined together through said light-transmissible transparent adhesive.

9. The luminous keying module according to claim 3, wherein said light-guiding film layer is made of polyethylene terephthalate (PET), polycarbonate (PC) or polymethylmethacrylate (PMMA).

10. The luminous keying module according to claim 2, wherein said first film layer is a light-guiding film layer, and said second film layer is a spacer film layer, wherein said spacer film layer is arranged between said light-guiding film layer and said plural membrane switches for increasing possibility of generating total internal reflection within said light-guiding film layer when said light beams are incident into said light-guiding film layer.

11. The luminous keying module according to claim 10, wherein said plural light-guiding dots are formed on a bottom surface of said light-guiding film layer.

12. The luminous keying module according to claim 11, wherein said spacer film layer is formed on said light-guiding film layer by a printing process, a film deposition process, a gluing process or a thermal compression process.

13. The luminous keying module according to claim 1, wherein said light-guiding membrane wiring board comprises a first film layer and a second film layer, wherein said second film layer is arranged between said first film layer and said plural membrane switches, wherein a refractive index of said second film layer is lower than a refractive index of said first film layer.

14. The luminous keying module according to claim 13, wherein said second film layer is a single continuous film layer or said second film layer comprises plural separate block-type film layers, wherein said second film layer is formed on said first film layer by a printing process, a film deposition process, a gluing process or a thermal compression process.

15. The luminous keying module according to claim 13, wherein said first film layer is a light-guiding film layer.

16. The luminous keying module according to claim 15, wherein said light-guiding film layer is made of polyethylene terephthalate (PET), polycarbonate (PC) or polymethylmethacrylate (PMMA).

17. The luminous keying module according to claim 1, wherein said light-emitting element is a light emitting diode, wherein said light emitting diode is located beside said light-guiding membrane wiring board for emitting said light beams to said light-guiding membrane wiring board.

18. The luminous keying module according to claim 1, wherein further comprising a base, which is disposed under said light-guiding membrane wiring board for supporting said keying layer, said elastic layer, said light-guiding membrane wiring board and said light-emitting element.

19. The luminous keying module according to claim 1, wherein said elastic layer is made of polyethylene terephthalate (PET).

20. The luminous keying module according to claim 1, wherein said plural conductive structures are formed on said bottom surface of said elastic layer by a printing process.

21. The luminous keying module according to claim 1, wherein each of said plural conductive structures is made of a metallic material or a carbonic material.

22. The luminous keying module according to claim 1, wherein said handheld device is a handheld communication device or a handheld remote controller.

* * * * *